United States Patent [19]

Lawrence

[11] Patent Number: 4,760,640

[45] Date of Patent: Aug. 2, 1988

[54] INSULATOR-JACK FOR REPLACING INSULATOR DISKS

[76] Inventor: William G. Lawrence, 525 Mill Grove Dr., Audubon, Pa. 19403

[21] Appl. No.: 914,630

[22] Filed: Oct. 2, 1986

[51] Int. Cl.$^4$ .................. B23P 19/00; B25B 1/00
[52] U.S. Cl. ........................ 29/760; 29/762; 174/150; 254/233; 269/256
[58] Field of Search .............. 29/402.03, 402.08, 239, 29/760, 762; 174/141 R, 150; 254/232, 233, 237; 269/43, 257, 130, 132, 256

[56] References Cited

U.S. PATENT DOCUMENTS 1,997,109  4/1935  Fyfe .................................. 174/150 X
3,400,872  9/1968  Rogers .............................. 269/287 X Primary Examiner—Timothy V. Eley
Attorney, Agent, or Firm—Paul & Paul

[57] ABSTRACT

An insulator-jack for replacing damaged electrical insulators in a string of insulators comprises a pair of threaded rods disposed in substantially parallel relation to one another, a pair of coplanar spaced-apart insulator clamping collars, each being connected to opposite ends of the rods by a pair of lateral arms, wherein one of the insulator clamping collars is movably positionable along the threaded rods by a pair of ratchet members to selectively vary the distance between the two clamping collars. The non-movable clamping collar is provided with an upwardly and inwardly projecting safety tongue which engages the connection between the insulator clamped within the collar and the next-above insulator in the string, and is also provided with inward projections along the internal periphery to securely engage the insulator and thereby prevents slippage of the insulator.

8 Claims, 1 Drawing Sheet

U.S. Patent    Aug. 2, 1988    4,760,640
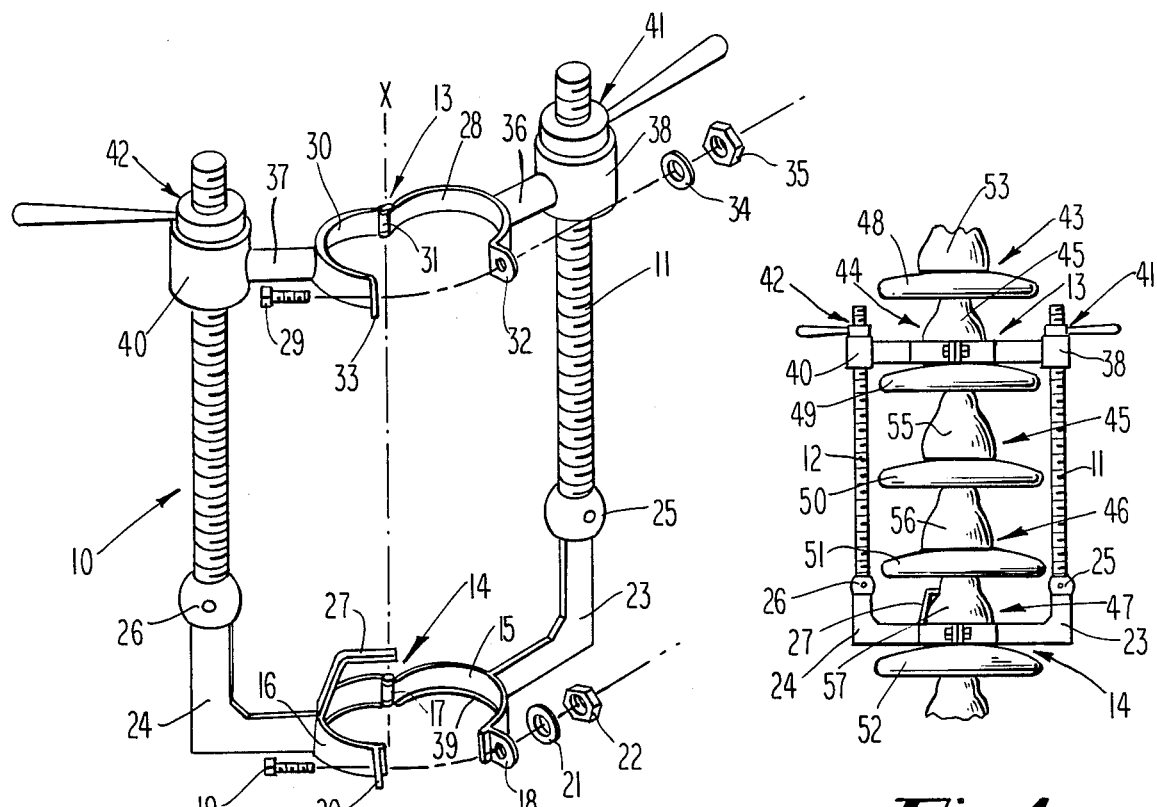
Fig. 2
Fig. 1
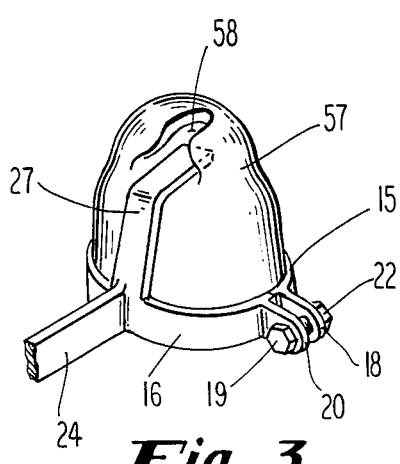
Fig. 3
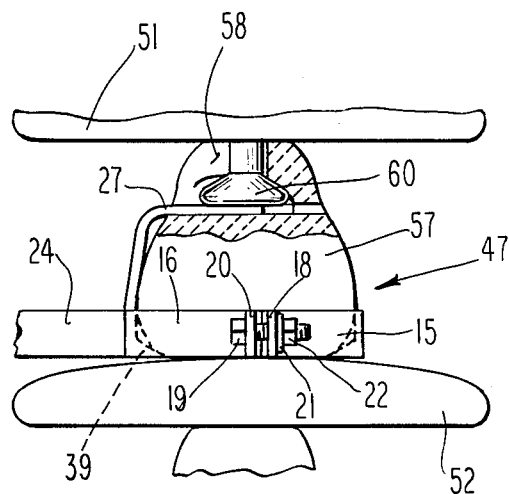
Fig. 4

INSULATOR-JACK FOR REPLACING INSULATOR DISKS

BACKGROUND OF THE INVENTION

This invention relates generally to an apparatus for use in high tension electrical transmission line maintenance and, more particularly, to an apparatus for replacing the electrical insulators used in such high tension lines.

High tension electrical transmission lines are supported above ground by a variety of support structures made of steel, wood, cement or the like. The electrical lines are typically connected to the support structure by a plurality of electrical insulators connected together in string fashion. The string of insulators supports the weight of the transmission lines and, as such, are under considerable tension. It is known, for example, that the tension in such transmission lines can vary widely depending upon the length of the line, etc., but is typically in the order of 485–36,000 lbs. Due to this considerable line tension, the procedure for replacing electrical insulators that have been damaged by lightening or malicious mischief, such as firearm discharge, is a complicated procedure. The replacement of damaged insulators is a regular occurrence in transmission line maintenance and is essential to prevent unnecessary power outages caused by flashovers.

The typical procedure for replacing damaged insulators was a lengthy, costly process requiring an insulator cradle, gin poles and other complex and cumbersome equipment. The transmission lines are de-energized for this process, at a cost in the order of $25,000 per hour of down-time. Thus, there is a great need for a procedure which reduces the time required to replace the insulators and, thus, the down-time for the line.

In U.S. Pat. No. 1,997,109 to Fyfe, one type of apparatus for replacing damaged insulators is disclosed. This apparatus, however, suffers from several disadvantages in a structural and operational sense. One such disadvantage is that the apparatus is comprised of multiple pieces which must be assembled around the string of insulators. That is, the apparatus is incapable of being assembled prior to application around the insulators. Moreover, because it is a multiple piece apparatus, it is time-consuming and difficult to assemble and increases the risk of a lineman dropping one of the pieces while suspended above ground.

Another disadvantage of the Fyfe apparatus is that it applies tension to the porcelain disk of the insulator. Typically, the insulators needed to be replaced have damaged disk portions and, in any event, the porcelain disk is not strong enough to support the degree of tension required to be applied to replace present day insulators.

Furthermore, the Fyfe apparatus was designed for use with insulators having a mortise and tenon connection and would not be expected to be applicable to the present day ball-and-socket insulators. In addition, the Fyfe apparatus does not have any safety features to prevent the insulators from slipping out of the apparatus while the insulators were being replaced.

I have invented a very simple insulator-jack which eliminates the need for complex, cumbersome equipment and greatly expedites the procedure for replacing insulators, and which can be assembled prior to application and which is faster and easier to operate than equipment heretofor known.

SUMMARY OF THE INVENTION

Accordingly, it is an object of the invention to provide an apparatus for replacing damaged insulators which is faster and easier to use than existing equipment and which greatly expedites this maintenance procedure.

It is another object of the invention to provide an apparatus for replacing damaged electrical insulators which uses insulator clamping means to securely clamp the insulators in the string and means for drawing the insulators together.

It is another object of the invention to use ratchet means to draw the insulator clamping means together.

It is another object of the invention to provide an apparatus for replacing electrical insulators which is safer to operate than existing equipment.

It is a further object of the invention to accomplish the above object by providing the lower insulator clamping means with a tongue member adapted to engage the connection between the clamped insulator and the next-above insulator in the string to prevent the disengagement of said insulators.

It is a further object of the invention to provide safety means on the lower clamping means to engage the groove between the porcelain disk and the steel cap of the insulator to prevent slippage of said clamped insulator out of said clamping means.

These and other objects of the invention will become apparent upon reading of the following description with reference to the drawings and the appended claims.

BRIEF DESCRIPTION OF THE DRAWINGS

FIG. 1 is a front elevational view of an insulator-jack in accordance with the invention as applied to a string of electrical insulators.

FIG. 2 is a perspective view, partially exploded, of an insulator-jack in accordance with the invention.

FIG. 3 is a partial perspective view of the lower clamping collar engaged with the insulator cap of an insulator, illustrating the positioning of the tongue member in the socket thereof.

FIG. 4 is an elevational view, partially sectioned, of the lower clamping collar engaged with the insulator, illustrating the position and function of the tongue member and the safety flange.

DETAILED DESCRIPTION OF THE INVENTION

With reference first being made to FIG. 2, illustrated therein is an insulator-jack in accordance with the principles of the invention. The insulator-jack 10 comprises a pair of threaded rods 11,12 disposed in substantially parallel relation to one another. An upper clamping unit 13 is disposed at one end of the rods and a lower clamping unit 14 is affixed to the other end of threaded rods 11,12.

Rods 11,12 may be of any suitable known type and construction, so long as they are of sufficient strength to withstand the tension stresses applied thereto when the apparatus is in use. Steel rods having Acme threads are preferred as they are rated to provide adequate strength and further, they facilitate the movement of the upper clamping unit 13 against the tension in the insulator string.

The lower clamping unit 14 comprises a split cylindrical collar formed by a pair of opposing concave arms 15,16 joined together by a suitable hinge connection 17. The collar is sized so as to closely fit around the metal cap of the insulator so that the cap may be securely retained therein when the apparatus is in use. It is preferable for the concave arms 15,16 to be beveled slightly inward at the lower edge to provide a closer fit around the cap.

The concave arms 15,16 are provided with projecting flanges 18,20 adjacent their free ends which flanges are adapted to receive a suitable fastener, such as for example bolt 19, washer 21, and nut 22. Although a bolt, washer and nut arrangement is being illustrated, it will be obvious to those skilled in the art to substitute a variety of fasteners in place thereof. For example, to reduce the number of pieces, it is to be understood that a bolt or nut may be suitably secured to one of the flanges, such as by welding. It is also to be understood that a gate-bolt type structure is also suitable as a securement or fastening means.

As illustrated in FIG. 2, it is preferable to have flanges 18,20 slightly spaced from the free ends of the concave arms 15,16 whereby the concave arms will meet one another while the flanges 18,20 are still slightly spaced apart. (See FIG. 3.) This arrangement insures that the requisite clamping tension may be achieved in nearly all circumstances.

Each of the concave arms 15,16 are securely affixed, such as by welding, to an L-shaped connecting arm 23,24, respectively. Although illustrated as being L-shaped, connecting arms 23,24 may be of any suitable configuration to connect the clamping collar to the threaded rods 11,12. In the embodiment illustrated in FIG. 2, connecting arms 23,24 are securely attached to the slotted bulbs 25,26 of threaded rods 11,12, respectively by pins. It is to be understood, however, that other suitable connections between rods 11,12 and connecting arms 23,24 are also possible. It is preferable, however, for rods 11,12 to be readily removable in the event that different length rods are desired, the significance of which is explained below.

Lower clamping unit 14 is also provided with a tongue member 27 which is securely affixed, preferably by welding, to concave arm 16. Tongue member 27 extends upwardly and inwardly from concave arm 16 and is sized so as to engage the connection between the insulator clamped within the lower clamping unit 14 and the next-above insulator in the string. The precise position and function of the tongue member 27 is more fully described hereinafter with reference to FIGS. 3 and 4.

An additional safety feature is provided on lower clamping unit 14 in the form of an inwardly extending projection at the lower edge of the concave arms 15,16. In the embodiment illustrated in FIG. 2, this safety projection is in the form of an annular flange 39. A plurality of small, space-apart, tooth-like wedge projections welded to the interior lower edge of the concave arms has also been found to be quite suitable. The projection, whether it be teeth or an annular flange 39, is sized so as to be received within the groove formed between the metal cap and porcelain disk of the insulators (See FIG. 4.) The safety feature engages the underside edge of the insulator cap when the insulator is clamped within the clamping collar and prevents the insulator from slipping out of the clamping collar in the event that excessive tension is applied to the string during replacement of the insulators.

The upper clamping unit 13 is of similar construction to lower clamping unit 14, just described, and comprises a split cylindrical collar portion having opposing concave arms 28,30 connected together by a hinge connection 31 and provided at the other ends with projecting flanges 32,33. As mentioned above with respect to the lower clamping unit 14, concave arms 28,30 are preferably bevelled whereby the upper edge is thicker than the lower edge to provide a secure clamp about the insulator clamp. Flanges 32,33 are also adapted to receive any suitable fastener to secure the concave arms 28,30 together, such as for example screw 29, washer 34, and nut 35 or any other suitable fastener as previously mentioned.

A pair of connecting arms 36,37 are provided, as above, which are rigidly affixed to the concave arms 28,30 at one end and to suitable ratchet collars 38,40 at the other end. Although connecting arms 36,37 may be of any suitable shape and construction, it is preferred that they be of a cylindrical configuration as it has been observed that this configuration provides a greater rigidity than flat bars.

Ratchet collars 38,40 may also be of any known, suitable type and may be cylindrical, as is illustrated, or they may be an open seat. Ratchet collars 38,40 are designed to house suitable ratchet members, such as ratchets 41,42 which may be of the trunion-and-bearing type or any other suitable ratchet means known in the art. Upon actuation of the ratchet members 41,42 in standard fashion, the upper clamping unit 13 will move along threaded rods 11,12 either towards or away from lower clamping unit 14, depending upon the direction of the ratchet action.

As seen in FIG. 2, upper and lower clamping units 13,14 are disposed to operate in the plane defined by the parallel threaded rods 11,12 and are in variably spaced-apart relation due to the movable feature of upper clamping unit 13. As also seen from the Figure, when the bolts and nuts or other collar fasteners are removed, the entire apparatus is pivotally openable through hinge connections 17,31 about a longitudinal axis X. When open, the insulator-jack 10 can readily be applied to a string of insulators and then secured in place by fastening the collars.

The insulator-jack apparatus of the invention is illustrated in FIG. 1 as applied to a typical insulator string having a plurality of electrical insulators 43-47 joined together by a ball-and-socket configuration. (See FIG. 4.) Each insulator 43-47 comprises a ceramic or porcelain disk portion 48-52 and metal cap portion 53-57, respectively. The metal caps 53-57 are cemented to the disk portions 48-52 with an abrasive non-slip cement adhesive (not shown). A steel bolt (not shown) is cemented inside the insulator which traverses the disk and terminates in the flared ball, which is disposed in a suitable slot in the metal cap of the next-below insulator in the string. (See FIG. 4.) A cotter key (not shown) is normally disposed within the socket below the ball to prevent any downward movement of the ball in the socket and thus an uncoupling of the insulators. The insulator-jack 10, when in the open position, is placed around the insulator string and then closed and secured in position by the collar fasteners. The insulators that are to be replaced are then positioned between the upper and lower clamping units 13,14. The cotter key in the socket of the insulator to be clamped within the lower clamping unit 14, such as insulator 47 in FIG. 1, is removed prior to application of the insulator-jack so that the tongue 27 may be received within the socket.

In the particular position illustrated in FIG. 1, insulator 44 is securely clamped within upper clamping unit 13 and insulator 47 is securely clamped within lower clamping unit 14. Insulator 46 is also secured by the positioning of tongue 27, as is described below. In this position, insulator 45 is to be replaced. It is to be understood, however, that the apparatus may be easily modified to replace more than one insulator at a time by simply replacing threaded rods 11,12 with similar threaded rods of the desired length. For example, it has been observed that the insulator-jack is quite practical for removal of three insulators at a time, in which case the apparatus is modified to clamp six insulators between the upper and lower clamping units. Of course, the number of insulators to be removed at one time will depend on such factors as the weight of the insulators, the skill of the lineman, and other like considerations.

Once the insulator-jack has been securely clamped in the desired position, the ratchet members 41,42 are actuated to move upper clamping unit 13 towards lower clamping unit 14, thereby providing slack in the insulator connections. Once the desired slack is obtained, the damaged insulators can easily be removed from the string and new insulators installed. Depending upon the tension in the particular insulator string being serviced, it may be desirable to use strain poles at the terminal ends of the string to relieve some of the tension. After the damaged insulators have been replaced, the ratchet members 41,42 are again actuated in the opposite direction to move the upper clamping unit 13 to its original position.

The safety features of the present invention incorporated in the lower clamping unit 14 are illustrated in FIGS. 3 and 4. The first such safety feature is the tongue member 27. As seen from the Figures, tongue member 27 is sized so as to be disposed within socket 58 of insulator cap 57 when the lower clamping unit 14 is clamped about insulator 47. As seen in FIG. 4, tongue member 27 is angled so as to be disposed below ball 60 of the next-above insulator in the string (insulator 46) in the space normally occupied by the above-mentioned cotter key. In this arrangement, tongue member 27 functions as the cotter key would to prevent any downward movement of ball 60 and thereby prevents insulator 46 from being disengaged from insulator 47 when slack is applied to the insulator string. Also, because tongue member 27 is secured between ball 60 and the interior of insulator 47, it prevents the apparatus from breaking loose in the case of a mishap. For example, if the strain poles were to malfunction during the maintenance procedure, a sudden increase in tension would be experienced in the insulator string which would tend to break loose the string from the apparatus. Such an occurrence is prevented by the tongue member.

An additional feature of the tongue member 27 is its ability to prevent relative twist between insulators 47 and 46 when slack is applied to the string. This feature is accomplished by the transverse disposition of the tongue member 27 in the socket 58, as illustrated in FIG. 3.

The second safety feature incorporated in the lower clamping unit 14 is the inwardly extending projection 39, which as mentioned above, may be in the form of an annular flange or a plurality of spaced-apart tooth-like projections. As seen in FIG. 4, the projection, in this case a flange, as designed to be received within the groove formed where the disk and cap of the insulator meet. As such, the flange 39 engages the lower edge of the cap 57 and thus prevents the cap from slipping out of the collar should a sudden increase in tension occur in the string.

The foregoing description illustrates the simplicity of construction and the ease of operation of the insulator-jack of the invention. The insulator-jack is readily applied to a string of insulators and greatly facilitates the removal and replacement of damaged insulators without the need for expensive, complex and cumbersome equipment, and reduces the overall cost of this maintenance procedure by reducing the amount of time required to replace the insulators.

The forms of the invention described and illustrated herein are for purposes of explanation only and not for purposes of limitation. Various alternatives and modifications may suggest themselves to those skilled in the art, all of which are intended to be within the scope and spirit of the invention as defined in the appended claims.

What is claimed is:

1. An apparatus for replacing electric insulators in a string of insulators, said apparatus comprising:
   (a) a pair of threaded rods disposed in substantially parallel relation to one another;
   (b) a first insulator clamping means rigidly affixed to one end of each of each said threaded rods, said first insulator clamping means comprising:
      (1) a hinged-split cylindrical collar adapted to engage an insulator in a string of insulators;
      (2) a pair of L-shaped arms rigidly affixed to generally opposite sides of said hinged-split cylindrical collar and extending outwardly therefrom, each of said L-shaped arms further being affixed to one end of one of said threaded rods, whereby said threaded rods are maintained in substantially perpendicular orientation to said hinged-split cylindrical collar and in substantially parallel relation to one another.
      (3) fastening means for securing said hinged-split cylindrical collar in a clamped closed position about an insulator;
   (c) a second insulator clamping means connected to the other end of each of said threaded rods for movement therealong, said second insulator clamping means comprising:
      (1) a hinged-split cylindrical collar adapted to engage an insulator in a string of insulators;
      (2) a pair of bars rigidly affixed to generally opposite sides of said hinged-split cylindrical collar and extending outwardly therefrom;
      (3) a pair of ratchet collars, each of which is affixed to a terminal end of one of said bars and disposed about one of said threaded rods;
      (4) fastening means for securing said hinged-split cylindrical collar in a clamped closed position about an insulator; and
   (d) means for selectively moving said second insulator clamping means along said threaded rods, whereby the distance between said first and second insulator clamping means is selectively variable to vary tension between insulators in a string of insulators disposed intermediate insulators clamped within said first and second insulator clamping means.

2. The apparatus of claim 1, wherein said first insulator clamping means further comprises upwardly and inwardly projecting tongue means affixed to said hinged-split cylindrical collar, said tongue means being adapted to engage a connection between adjacent insulators in a string of insulators, said tongue means comprising means for preventing:
  (a) accidental release of said apparatus from a string of insulators;
  (b) undesired disengagement between adjacent insulators in a string of insulators; and
  (c) relative twist between adjacent insulators in a string of insulators.

3. The apparatus of claim 2, wherein said first insulator clamping means further comprises at least one projection inwardly extending from said hinged-split cylindrical collar and adapted to securely engage an insulator clamped within said hinged-split cylindrical collar.

4. The apparatus of claim 3, wherein said projection comprises an annular flange.

5. The apparatus of claim 1, wherein said first insulator clamping means further comprises at least one projection inwardly extending from said hinged-split cylindrical collar and adapted to securely engage an insulator clamped within said hinged-split cylindrical collar.

6. The apparatus of claim 5, wherein said projection comprises an annular flange.

7. The apparatus of claim 1, wherein said means for selectively moving said second insulator clamping means comprises ratchet means disposed within each of said ratchet collars and in operable engagement with said threaded rods.

8. An apparatus for replacing electrical insulators in a string of insulators under tension, said apparatus comprising:
  (a) a pair of threaded rods disposed in substantially parallel relation to one another;
  (b) a first insulator clamp comprising a hinged-split cylindrical collar adapted to be securely engageable with an electrical insulator and fastening means for securing said hinged-split cylindrical collar in a clamped closed position;
  (c) a pair of L-shaped members each of which is rigidly affixed to said hinged-split cylindrical collar and to one of said threaded rods;
  (d) an upwardly and inwardly projecting tongue rigidly affixed to said hinged-split cylindrical collar, said tongue being adapted to engage a connection between adjacent insulators in a string of insulators to prevent undesirable disengagement of adjacent insulators upon a decrease in tension of a string of insulators, to facilitate engagement between said first insulator clamp and an insulator clamped therein, and to prevent relative twist between adjacent insulators in a string of insulators;
  (e) an annular flange inwardly projecting from said hinged-split cylindrical collar and adapted to securely engage an insulator clamped therein;
  (f) a second insulator clamp comprising a hinged-split cylindrical collar adapted to be securely engagable with an electrical insulator and fastening means for securing said hinged-split cylindrical collar in a clamped closed position;
  (g) a pair of cylindrical bars each of which is rigidly affixed to said hinged-split cylindrical collar of said second clamp;
  (h) a ratchet collar ridigly affixed to each of said cylindrical bars and disposed about the other end of one of said threaded rods;
  (i) a ratchet mechanism disposed within said ratchet collar and in operable engagement with one of said threaded rods; and
  (j) wherein upon actuation of said ratchet mechanism, said second insulator clamp is selectively movable along said threaded rods to vary the distance between said first and second insulator clamps.

* * * * *